(12) United States Patent
Yadav et al.

(10) Patent No.: US 6,214,195 B1
(45) Date of Patent: Apr. 10, 2001

(54) METHOD AND DEVICE FOR TRANSFORMING CHEMICAL COMPOSITIONS

(75) Inventors: Tapesh Yadav, Boulder; Bijan Meramadi, Longmont, both of CO (US)

(73) Assignee: Nanomaterials Research Corporation, Longmont, CO (US)

(*) Notice: Subject to any disclaimer, the term of this patent is extended or adjusted under 35 U.S.C. 154(b) by 0 days.

(21) Appl. No.: 09/165,439

(22) Filed: Oct. 2, 1998

Related U.S. Application Data

(60) Provisional application No. 60/100,269, filed on Sep. 14, 1998.

(51) Int. Cl.[7] .............. C25D 11/00; C25B 3/00; C25B 1/00; C25B 1/02
(52) U.S. Cl. ............... 205/334; 205/413; 205/464; 205/555; 205/637
(58) Field of Search ............... 204/157.15, 265, 204/274, 278; 205/334, 413, 464, 637 555

(56) References Cited

U.S. PATENT DOCUMENTS

| | | | |
|---|---|---|---|
| 5,538,698 | * 7/1996 | Abe et al. | 422/174 |
| 5,945,231 | 8/1999 | Narayanan et al. | 429/30 |
| 5,968,337 | 10/1999 | Surma et al. | 205/688 |

FOREIGN PATENT DOCUMENTS

| | | |
|---|---|---|
| 48-20104 | 6/1973 | (JP) . |
| 61-278346 | 12/1986 | (JP) . |
| 7-265862 | * 10/1995 | (JP) . |

OTHER PUBLICATIONS

Graham J. Hutchings, Catherine S. Heneghan, Ian D. Hudson and Stuart H. Taylor, "Uranium–Oxide–Based Catalysts for the Destruction of Volatile Chloro–Organic Compounds," Nature, vol. 384, Nov. 28, 1996.

Tiejun Zhang and Michael D. Amiridis, "Hydrogen Production Via the Direct Cracking of Methane Over Silica–Supported Nickel Catalysts," Dept. of Chemical Engineering, University of South Carolina, Applied Catalysis A: General 167 (1998) 161–172. no month available.

M. L. Cubiero and J. L. G. Fierro, "Partial Oxidation of Methanol Over Supported Palladium Catalysts," Applied Catalysis A: General 168 (1998) 307–322. no month available.

* cited by examiner

*Primary Examiner*—Edna Wong
(74) *Attorney, Agent, or Firm*—Stuart T. Langley

(57) ABSTRACT

Methods and devices for transforming less desirable chemical species into more desirable or useful chemical forms are disclosed. The specifications can be used to treat pollutants into more benign compositions and to produce useful chemicals from raw materials and wastes. The methods and devices disclosed utilize electrical current induced by electromagnetic field and high surface area formulations. The invention can also be applied to improve the performance of existing catalysts and to prepare novel devices.

18 Claims, 3 Drawing Sheets

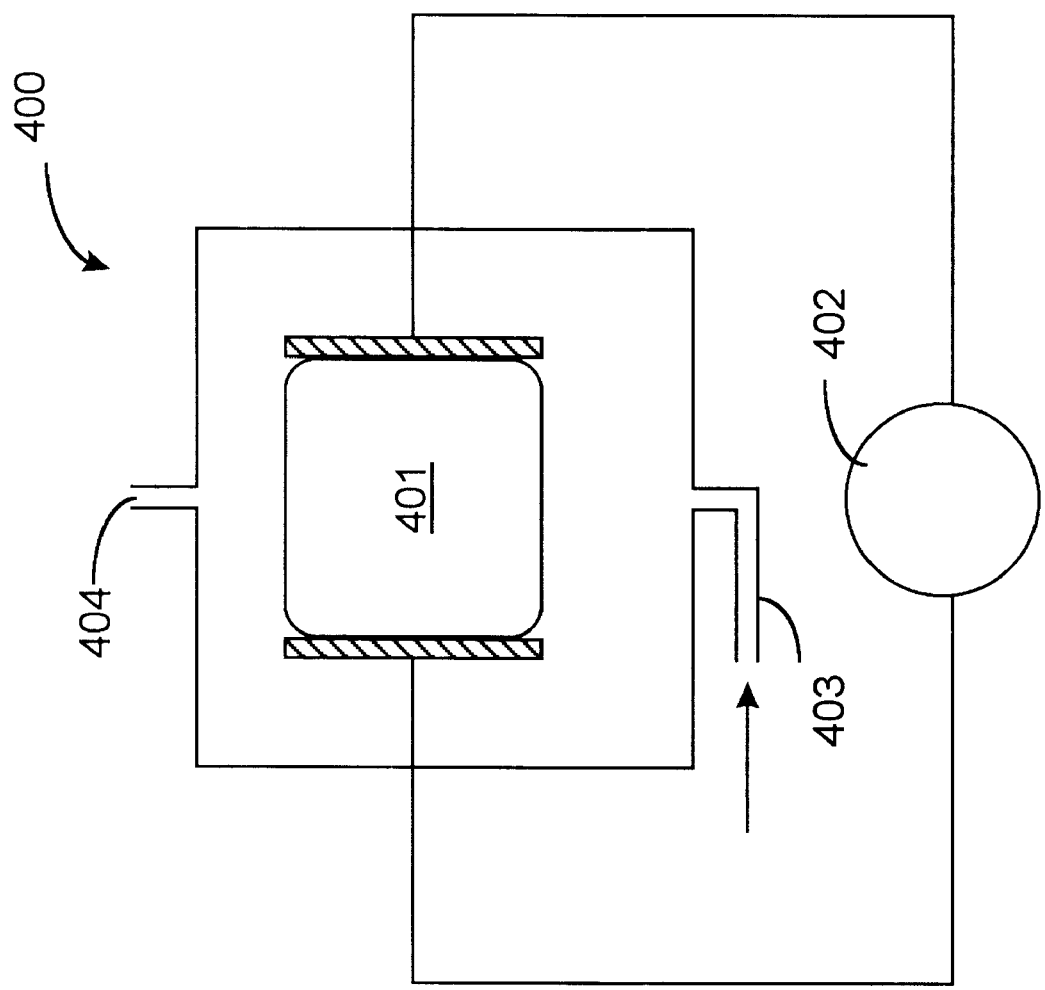

METHOD AND DEVICE FOR TRANSFORMING CHEMICAL COMPOSITIONS

This application claims benefit and priority of commonly assigned U.S. Provisional Application 60/100,269, "A Method and Device for Transforming Chemical Compositions" filed Sep. 14, 1998, which is incorporated herein by reference.

BACKGROUND OF THE INVENTION

1. Field of the Invention

The present invention relates, in general, to catalytic processing and devices for catalytic processing, and, more particularly, to a method and apparatus for enhanced catalytic processing using nanomaterial catalyst compositions in an electric field.

2. Relevant Background

Chemical and materials synthesis and transformation is one of the core industries of world economy. Numerous substances are synthesized using processes that require non-ambient temperatures and/or non-ambient pressures that require capital intensive equipment. Methods that can produce useful chemicals and materials at conditions closer to ambient conditions and simple equipment are economically, ecologically, and environmentally more desirable.

Chemical species such as volatile organic chemicals (VOCs), heavy metals in waste water and bioactive chemicals are pollutants of serious concern. A need exists for processes and devices that can convert these substances into more benign forms such as carbon dioxide and water vapor. Techniques currently in use include incineration, absorption/desorption, chemical wash and photocatalysis. Incineration is a high energy process and often leads to non-benign secondary emissions such as nitrogen oxides (NOx) and unburned hydrocarbons. Photocatalysis systems are expensive to install and require high maintenance to avoid degrading efficiencies and treatment reliability. Other techniques lead to secondary wastes and leave the ultimate fate of the pollutants unresolved. A technique is needed that can reliably treat chemical pollutants in a cost effective manner.

Numerous industries use catalytic processing techniques either to produce useful materials and compositions or to reduce waste or pollutants. Examples of such industries include those based on electricity generation, turbines, internal combustion engines, environmental and ecological protection, polymer and plastics manufacturing, petrochemical synthesis, specialty chemicals manufacturing, fuel production, batteries, biomedical devices, and pharmaceutical production. These industries are in continuous need of new catalysts and catalytic processes that can impact the costs and performance of the products generated by these industries.

Currently, processes and methods based on homogeneous and heterogeneous catalysis are integral and important to modern industrial, energy, and environmental chemistry. In petroleum and petrochemical industry, catalysis is used in numerous purification, refining, cracking, or reaction steps. In the purification of synthetic gaseous and liquid fuels from crude oil, coal, tar sand, and oil shale, catalysis is important. Approximately two thirds of leading large tonnage chemicals are manufactured with the help of catalysis. Illustrative examples include acetic acid, acetaldehyde, acetone, acryolonitrile, adipic acid, ammonia, aniline, benzene, bisphenol A, butadiene, butanols, butanone, caprolactum, cumene, cyclohexane, cyclohexanone, cyclohexanol, phtalates, dodecylbenzene, ethanol, ethers, ethylbenzene, ethanol, methanol, ethylbenzene, ethylene dichloride, ethylene glycol, ethylene oxide, ethyl chloride, ethyl hexanol, formaldehyde, hydrogen, hydrogen peroxide, hydroxylamine, isoprene, isopropanol, maleic anhydride, methyl amines, methyl chloride, methylene chloride, nitric acid, perchloroethylene, phenol, phthalic anhydride, propylene glycol, propylene oxide, styrene, sulfur, sulfuric acid, acids, alkalis, terephthalic acid, toluene, vinyl acetate, vinyl chloride, and xylenes.

Further, most of the production of organic intermediates used to make plastics, elastomers, fibers, pharmaceuticals, dyes, pesticides, resins, and pigments involve catalytic process steps. Food, drinks, clothing, metals, materials manufacturing often utilizes catalysts. Removal of atmospheric pollutants from automobile exhausts and industrial waste gases requires catalytic converters. Liquid wastes and stream also are routinely treated with catalysts. These applications need techniques, methods, and devices that can help research, identify, develop, optimize, improve, and practice superior performing catalysts of existing formulations, of evolved formulations, and of novel formulations.

Many new products are impractical to produce due to high manufacturing costs and/or low manufacturing yields of the materials that enable such products. These limitations curtail the wide application of new materials. Novel catalysts can enable products that are currently too expensive to manufacture or impossible to produce for wide ranges of applications that were, until now, cost prohibitive. A need exists for techniques to develop such novel catalysts.

The above and other limitations are solved by a chemical transformation device and method for processing chemical compositions that provides efficient, robust operation yet is implemented with a simplicity of design that enables low cost implementation in a wide variety of applications. These and other limitations are also solved by a method for making a chemical transformation device using cost efficient processes and techniques.

SUMMARY OF THE INVENTION

In one aspect, the invention includes a method of chemically transforming a substance through the simultaneous use of a catalyst and electrical current. This method comprises selecting an active material which interacts with an applied electromagnetic field to produce a current. A high surface area (preferably greater than 1 square centimeter per gram, more preferably 100 square centimeter per gram, and most preferably 1 square meter per gram) form of the active material is prepared. The active material is formed into a single layer or multilayered structure that is preferably porous. The stream containing substance that needs to be transformed is exposed to the active material structure while charge flow is induced by the applied electromagnetic field. Where appropriate, the product stream is collected after such exposure.

In a related aspect, the invention comprises a method of manufacturing a device comprising an active material preferably with high band gap (preferably greater than 0.5 eV, more preferably 1.5 eV, most preferably 2.5 eV). The active material is preferably provided a high surface area form such as a nanostructured material or a nanocomposite or a high internal porosity material. A porous structure comprising at least one layer of the active material and electrodes positioned on the at least one layer to enable an electromagnetic field to be applied across the at least one layer. It is preferred that the resistance of the device between the electrodes be between 0.001 milliohm to 100 megaohm per unit ampere of current flowing through the device, more preferably between 0.01 milliohm to 10 megaohm per unit ampere of current flowing through the device, and most preferably 1 milliohm to 1 megaohm per unit ampere of current flowing through the device.

In case the current flow measure is not known or difficult to measure, it is preferred that the corresponding power consumption levels for the device be used to practice this invention. To illustrate, in case of electromagnetic field is externally applied, then it is preferred that the power consumption due to device operation be between 0.001 milliwatt to 100 megawatt. While miniature, thin film, and micromachined devices may utilize power less than these and applications may use power higher than these levels, and such applications are herewith included in the scope of this invention, in all cases, design and/or operation that leads to lower power requirement is favored to minimize the operating costs by the device. Higher resistances may be used when the chemical transformation step so requires. In case, alternating current is used, the overall impedance of the device must be kept low to reduce energy consumption and operating costs. Once again, the yield, the selectivity, the operating costs and the capital costs of the device must be considered in designing, selecting, and operating the device.

In another aspect, the present invention provides methods for the preparation of a device for chemically transforming a species through the use of electromagnetic field. Additionally, the present invention describes products prepared using such devices for chemically transforming a species with electromagnetic field. In another aspect, the present invention describes applications of novel fluid and chemical composition transformation technique.

METHOD OF OPERATION

The device is operated by placing the active material in a direct current or alternating current electrical circuit that leads to flow of charge. The charge flow can be through flow of electrons, flow of ions, or flow of holes. In one embodiment, it is preferred that during operation, the circuit be switched on first such that charges begin to flow in the circuit. Next, feed material is exposed to the active material for duration desired and the products resulting from such exposure are collected. In another embodiment it is preferred that the feed material be in contact with the active material catalyst first, next the flow of charge is initiated by switching on the electrical circuit. In yet another embodiment, the circuit is switched on to induce flow of charge that lights-off the desired reaction which is then followed by changing the electromagnetic field that best favors the performance of the catalyst, the yield, the selectivity, the operating costs and the capital costs of the device. In another embodiment, the circuit is operating in a time varying or pulsating or pre-programmed switching on and off of the electrical circuit to induce corresponding flow of charge through the active material.

In one or more embodiments, the device may be cooled or heated using secondary sources, pressurized or evacuated using secondary sources, photonically and optically activated or isolated using secondary sources, laser activated or field influenced using secondary sources. The device may be heated or cooled to desired temperature through resistive or convective or radiative heating for illustration, pressurized or evacuated to desired pressure through piezo effects for illustration, photonically and optically activated to desired photonic influence through phosphorescence affects for illustration. The device may assist such functions by design through the use of the electrical current directly, i.e. the current affects the catalyst and also enables such desired state variables. The device may be free standing or fully supported or partially supported. The device may be operated in steady state, unsteady state, pulsed mode, continuous or batch mode, symmetric waveforms, unsymmetric waveforms, in motion or in stationary state.

BRIEF DESCRIPTION OF THE DRAWINGS

FIG. 4 shows a schematic view of a chemical transformation reactor in accordance with the present invention.

DETAILED DESCRIPTION OF THE PREFERRED EMBODIMENTS

Figure 2:
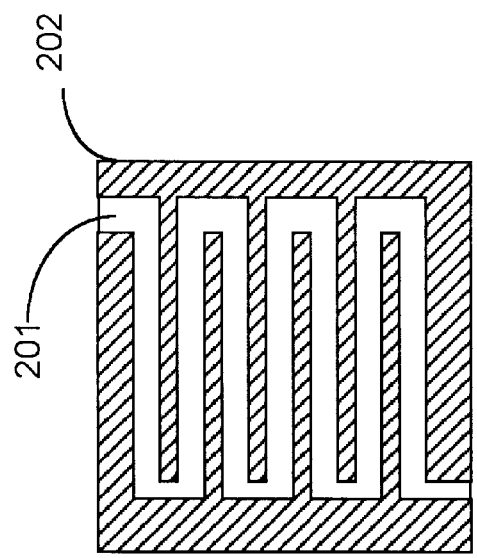
FIG. 2 shows a schematic view of a preferred alternative chemical transformation device in accordance with the present invention.

The present invention involves all phases of catalytic processing including devices for performing catalytic processing, methods of making devices for catalytic processing, and methods for operating devices to perform catalytic processing. The present invention is described in terms of several specific examples but it is readily appreciated that the present invention can be modified in a predictable manner to meet the needs of a particular application. Except as otherwise noted herein, the specific examples shown herein are not limitations on the basic teachings of the present invention but are instead merely illustrative examples that aid understanding.

The present invention is described using terms of defined below:

"Catalysis," as the term used herein, is the acceleration of any physical or chemical or biological reaction by a small quantity of a substance—herein referred to as "catalyst"—the amount and nature of which remain essentially unchanged during the reaction. Alternatively, the term, includes applications where the catalyst can be regenerated or its nature essentially restored after the reaction by any suitable means such as but not limiting to heating, pressure, oxidation, reduction, and microbial action. For teachings contained herein, a raw material is considered catalyzed by a substance into a product if the substance is a catalyst for one or more intermediate steps of associated physical or chemical or biological reaction.

"Chemical transformation," as the term used herein, is the rearrangement, change, addition, or removal of chemical bonds in any substance or substances such as but not limiting to compounds, chemicals, materials, fuels, pollutants, biomaterials, biochemicals, and biologically active species. The terms also includes bonds that some in the art prefer to not call as chemical bonds such as but not limiting to Van der Waals bonds and hydrogen bonds.

"Nanomaterials," as the term is used herein, are substances having a domain size of less than 250 nm, preferably less than 100 nm, or alternatively, having a domain size sufficiently small that a selected material property is substantially different (e.g., different in kind or magnitude) from that of a micron-scale material of the same composition due to size confinement effects. For example, a property may differ by about 20% or more from the same property for an analogous micron-scale material. In case the domain size is difficult to measure or difficult to define such as in porous networks, this term used herein refers to substances that have interface area greater than 1 square centimeter per gram of the substance. The ratio of the maximum domain dimension to minimum domain dimension in the catalyst for this invention is greater than or equal to 1. The term nanomaterials includes coated, partially coated, fully coated, island, uncoated, hollow, porous, and dense domains. Furthermore, nanomaterials may be produced by any method to practice this invention.

"Domain size," as the term is used herein, is the minimum dimension of a particular material morphology. The domain size of a powder is the grain size. The domain size of a whisker or fiber is the diameter, and the domain size of a film or plate is the thickness.

"Confinement size" of a material, as the term is used herein in reference to a fundamental or derived property of interest, is the mean domain size below which the property becomes a function of the domain size in the material.

"Activity" of a catalyst, as the term used herein, is a measure of the rate of conversion of the starting material by the catalyst.

"Selectivity" of a catalyst, as the term used herein, is a measure of the relative rate of formation of each product from two or more competing reactions. Often, selectivity of a specific product is of interest, though multiple products may interest some applications.

"Stability" of a catalyst, as the term used herein, is a measure of the catalyst's ability to retain useful life, activity and selectivity above predetermined levels in presence of factors that can cause chemical, thermal, or mechanical degradation or decomposition. Illustrative, but not limiting, factors include coking, poisoning, oxidation, reduction, thermal run away, expansion-contraction, flow, handling, and charging of catalyst.

"Porous" as used herein means a structure with sufficient interstitial space to allow transport of reactant and product materials within the structure to expose the reactant materials to the constituent compositions making up the porous structure.

Figure 1:
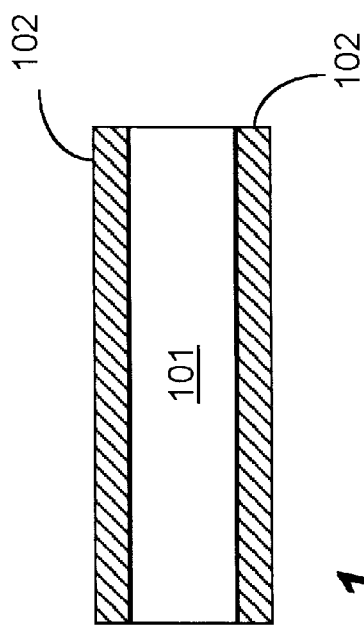
FIG. 1 shows a schematic view of a chemical transformation device in accordance with the present invention.

FIG. 1 illustrates an embodiment of the present invention in its most basic form. Essentially, an active layer 101 is sandwiched between two electrodes 102. Active layer 101 comprises a material that either as applied or as later modified by postprocessing acts as a catalyst for the conversion of a particular feed composition into a desired product composition. The dimensions and geometry of active layer 101 are selected to provide both sufficient exposure to a feed composition (i.e., a composition that is to be catalyzed) and to allow an impeded current flow between electrodes 102 when an electromagnetic field is applied across electrodes 102.

Although specific examples of materials suitable for active layer 101 are set out below, active layer 101 more generally comprises a material that is an active catalyst for a desired reaction when activated by an applied electric field. The properties of active layer 101 are selected to allow active layer 101 to both support an electric field and conduct current. It is not necessary that active layer 101 be active as a catalyst at ambient conditions. However, in some embodiments, the active layer 101 may have catalytic activity in ambient or non-ambient conditions even when an electric field is not applied between electrodes 102.

FIG. 2 illustrates a preferred alternative configuration in which electrodes 202 and active layers 101 are arranged in a multilayer or interdigitated structure. The structure shown in FIG. 2 provides greater interface area between electrodes 202 and active layers 201 as compared to the embodiment shown in FIG. 1. The structures shown in FIG. 1 and FIG. 2, as well as other structural variants that enable the electrode-active layer interaction described herein, are considered equivalent for purposes of the present invention unless specifically indicated otherwise.

In case the resistive component between electrodes 202 is the mechanistic impedance limiting the performance of the device, the parallel multilayer structure shown in FIG. 2 can reduce the impedance of the chemical transformation device in accordance with the present invention. The individual active layers 101 or electrodes can be the same or different formulation. It is contemplated that one or more active layers 101 may be replaced by a material capable of a secondary but desired function. For example, one active layer 101 can be replaced with a resistive composition by design to provide heat to the device. In some embodiments it may be desirable to have one or more active layers replaced with EMI (electromagnetic interference) filter layers to shield or affect the active layer from inductively or capacitively coupling with the environment. In another embodiment, one of the layers can be air or an insulating layer in order to provide thermal isolation to the active layer. In yet another embodiment, sensing layers may be provided to sense the concentration of one or more species in the feed or processed or recycle stream. In yet another embodiment, electrochemical couple layers may be provided to internally generated electricity and energy needed to satisfactorily operate the device. In other embodiments, the electrode layers can function as anodes and cathodes. In some embodiments, the device may be a minor part of the multilaminate device and the device containing device can have primary function of reliably providing an electrical, thermal, magnetic, electromagnetic, optical, or structural function in an application. The active layer can also comprise multilaminates of different material formulations.

A method for preparing a chemical composition transformation device in accordance with the present invention involves selecting an active material comprising a surface that physically, chemically, or biologically interacts with the substance that is desired to be transformed or with one of the intermediates of such substance. The active material is prepared in a high surface area form (i.e., a form that exhibits a surface area of preferably greater than 1 square centimeter per gram, more preferably 100 square centimeter per gram, and most preferably 1 square meter per gram). It is believed that the present invention is enhanced by the interaction between the surface area of particles making up the active layer 101 and the applied electromagnetic field. Accordingly, a higher surface area form tends to increase desirable catalytic behavior for a given quantity of material.

Figure 3:
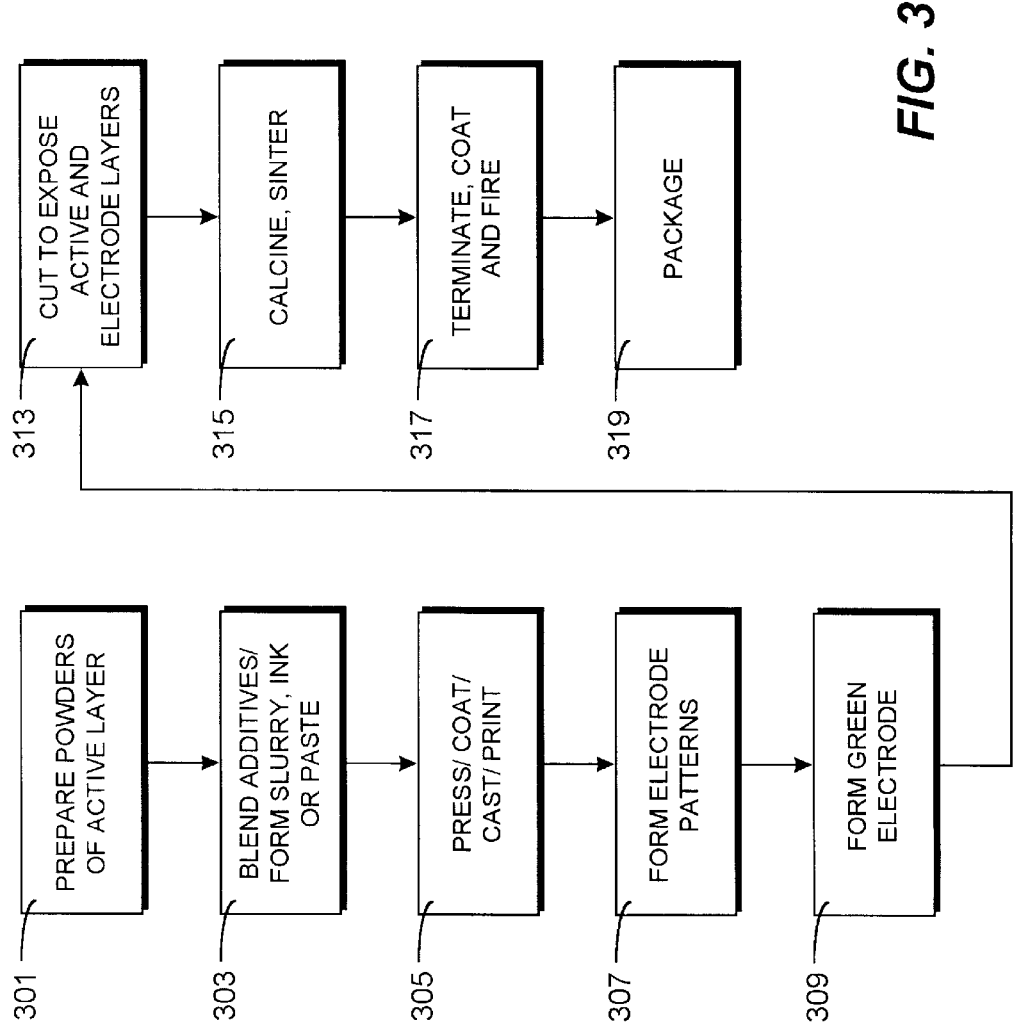
FIG. 3 shows a flow diagram of major steps in a process in accordance with the present invention.

FIG. 3 illustrates basic steps in an exemplary process for manufacturing a catalytic device in accordance with the present invention. The active material, usually prepared as a powder or powder mixture in step 301 and then optionally blended with additional compositions to form a slurry, ink or paste for screen printing in step 303. In step 305 the active material is directly or alternatively formed into a film, pellet, or multilayer structure comprising the-active material. The film, pellet, or multilayer structure may be prepared as free standing or on a substrate.

The active layer structure may be porous or the structure may be non-porous. It is preferred that the device be porous to reduce pressure drop and enhance contact of the active element with the chemical species of interest. Table 1 lists some catalysts and pore size ranges to illustrate but not limit the scope:

TABLE 1

Catalyst Types and Pore Sizes

| (1) Catalyst | Average Pore Radius (Å) |
| --- | --- |
| Activated carbons | 10–20 |
| Silica gels | 15–100 |
| Silica-alumina cracking catalysts ~ 10–20% $Al_2O_3$ | 15–150 |
| Silica-alumina (steam deactivated) | 155 |
| Silica-magnesia microsphere: NALCO ®, 25% MgO | 14.3 |
| Da-5 silica-magnesia | 11.1 |
| Activated clays | ~100 |
| TCC clay pellets (MgO, CaO, $Fe_2O_3$, $SO_4$) = ~10% | 26.3 |
| Clays: | |
| Montmorrillonite (heated 550° C.) | 25.2 |
| Vermiculite | ~314 |
| Activated alumina (ALORICO) | 45 |
| CoMo on alumina | 20–40 |
| Kieselguhr CELITE ® 296) | 11,000 |
| Fe-synthetic $NH_3$ catalyst | 200–1000 |
| Co—$ThO_2$-Kieselguhr 100:18:100 (reduced) pellets | 345 |
| Co—$ThO_2$—MgO (100:6:12) (reduced) granular | 190 |
| Co-Kieselguhr 100:200 (reduced) granular | 2030 |
| Porous plate (Coors No. 760), Pumice, Fused Copper Catalyst, Ni Film, Ni on Pumice | 2150 |

In other embodiments, the structure may be smooth or wavy, flexible or rigid, homogeneous or heterogeneous, undoped or doped, flat or cylindrical or any other shape and form, nanostructured or non-nanostructured. In all cases, this invention prefers that the material compositions chosen be physically robust in presence of all species in its environment in particular and all environmental variables in general for a duration equal to or greater than the desired life for the device. In all cases, this invention requires that the material selected has a finite impedance in the presence of electromagnetic field.

Once a suitable material composition has been selected for use in the chemical composition transformation device, in one embodiment, namely the formation of a chemical composition transformation device, a disc or body or single active layer laminated stack structure (as shown in FIG. 1) is formed, or in another embodiment a multilayer structure (as shown in FIG. 2) is formed in step 305 from the selected active material.

The active material layer formed in step 305 or structure or device form can be formed by any method or combination of methods, including but not limited to spin coating, dip coating, surface coating a porous structure, powder pressing, casting, screen printing, tape forming, precipitation, sol-gel forming, curtain deposition, physical sputtering, reactive sputtering, physical vapor deposition, chemical vapor deposition, ion beam, e-beam deposition, molecular beam epitaxy, laser deposition, plasma deposition, electrophoretic deposition, magnetophoretic deposition, thermophoretic deposition, stamping, cold pressing, hot pressing, explosion, pressing with an additive and then removal of the additive by heat or solvents or supercritical fluids, physical or chemical routes, centrifugal casting, gel casting, investment casting, extrusion, electrochemical or electrolytic or electroless deposition, screen-stencil printing, stacking and laminating, brush painting, self-assembly, forming with biological processes, or a combination of one or more of the above-mentioned methods.

The active material can be in film form or dispersed particle form or bulk form or wire form. The cross section area of the active material structure can be few microns square to thousands of meters square depending on the needs of the application. In a preferred embodiment, the active material can also be doped with available promoters and additives to further enhance the device's performance. In another preferred embodiment, the active material can also be mixed with inert elements and compositions and insulating formulations to further reduce capital or operating costs such as those from raw materials and pressure drop.

In another preferred embodiment, the active layer comprises functional materials such as those that provide thermal, sensing, pressure, charge, field, photons, structural, regeneration or other needed functions. Secondary treatments of the active material through sintering, pressurization, doping, chemical reactions, solid state reaction, self propagating combustion, reduction, oxidation, hydrogenation, and such treatments may enhance the performance of the active layer.

Possible compositions of the active material include but are not limited to one or more of the following materials: dielectrics, ferrites, organics, inorganics, metals, semimetals, alloy, ceramic, conducting polymer, non-conducting polymer, ion conducting, non-metallic, ceramic-ceramic composite, ceramic-polymer composite, ceramic-metal composite, metal-polymer composite, polymer-polymer composite, metal-metal composite, processed materials including paper and fibers, and natural materials such as mica, percolated composites, powder composites, whisker composites, or a combination of one or more of these. Illustrative formulations include but are not limited to doped or undoped, stoichiometric or non-stoichiometric alloy or compound of s-, p-, d-, and f-group of periodic table. Illustrative compositions that can be utilized in this invention as is or on substrates include one-metal or multi-metal oxides, nitrides, carbides, borides, indium tin oxide, antimony tin oxide, rare earth oxides, silicon carbide, zirconium carbide, molybdenum carbide, bismuth telluride, gallium nitride, silicon, germanium, iron oxide, titanium boride, titanium nitride, molybdenum nitride, vanadium nitride, zirconium nitride, zirconium boride, lanthanum boride, iron boride, zirconates, aluminates, tungstates, carbides, suicides, borates, hydrides, oxynitrides, oxycarbides, carbonitrides, halides, silicates, zeolites, self-assembled materials, cage structured materials, fullerene materials, nanotube materials, phosphides, nitrides, chalcogenides, dielectrics, ferrites, precious metals and alloys, non-precious metals and alloys, bimetal and polymetal systems, ceramics, halogen doped ceramics (such as, but not limiting to fluorine doped tin oxide), stoichiometric or non-stoichiometric compositions, stable and metastable compositions, dispersed systems, dendrimers, polymers, enzymes, organometallics, bioactive molecules, and mixtures thereof. Some specific, but not limiting, examples are listed in Table 2A, 2B, and 2C.

TABLE 2A

Illustrative Metals and Semimetals

| | | | |
|---|---|---|---|
| Ru | Rh | Pd | Ag |
| Os | Ir | Pt | Au |
| Re | W | Zn | Hg |
| Fe | Co | Ni | Cu |
| Pb | Bi | Sb | Sn |
| Te | Se | As | Cd |
| Mo | Ti | Zr | Ce |

TABLE 2B

Illustrative Alloys

| Catalyst | Added Metal to Form Alloy | Illustrative Reaction |
|---|---|---|
| Pt | 5–20% Rh | ammonia oxidation |
| Ag | Au | ethylene oxidation |
| Ag | 10% Au | cumene oxidation |
| Pt | Ge, Sn, In, Ga | dehydrogenation and cracking of alkanes |
| Pt | Sn + Re | dehydrocycilization and aromatization of alkanes |
| Pt | Pb, Cu | dehydrocycilization and aromatization of alkanes |
| Pt, Pd, Ir | Au | oxidative dehydrogenation of alkanes; n-butene $d_3$ butadiene, methanal $d_3$ formaldehyde |
| Ru, Os | Cu (Ag) | catalytic reforming |
| Ir | Au (Ag, Cu) | catalytic reforming of alkanes and cycloalkanes |
| Pd | | alkaned dehydrogenation and dehydrocyclization |

TABLE 2C

Illustrative Oxide Ceramics

| | | | |
|---|---|---|---|
| CaO, SrO, BaO | $WO_3$, $UO_3$ | NiO, $Cu_2O$, CuO | HgO, $PbO_2$, $Bi_2O_5$ |
| $Al_2O_3$, $SiO_2$, $P_2O_5$ | $Ta_2O_5$, $HfO_2$ | FeO, CoO, $Co_3O_4$, | $Cr_2O_3$, MnO, $Fe_3O_4$ |
| BeO, $B_2O_3$, MgO | $Nb_2O_5$, $MoO_3$ | CdO, $SnO_2$, $Sb_2O_5$, | ZnO, $GeO_2$, $As_2O_5$ |
| $Al_2O_3$—$SiO_2$ | $HfO_2$, $Fe_2O_3$ | $ZrO_2$—$SiO_2$ | $Sc_2O_3$, $TiO_2$ |
| BeO—$SiO_2$ | $ZrO_2$, $V_2O_5$ | $Y_2O_3$—$SiO_2$ | $La_2O_3$—$SiO_2$ |
| $Ga_2O_3$—$SiO_2$ | MgO—$SiO_2$ | $SnO_3$—$SiO_2$ | $Sb_3O_3$—$SiO_2$ |

Additionally, the formed active layer 101 can be porous or non-porous, flat or tapered, uniform or non-uniform, planar or wavy, straight or curved, non-patterned or patterned, micron or sub-micron, micromachined or bulk machined, grain sized confined or not, homogeneous or heterogeneous, spherical or non-spherical, unimodal or polymodal, or a combination of one or more of these.

In a preferred embodiment, the electrode structures formed in steps 307 and 309 and illustrated in FIG. 1 and FIG. 2 as 102 and 202, may comprise any composition with a lower impedance than the active material composition. The composition of the electrode layer can include, but is not limited to, organic materials, inorganic materials, metallic, alloy, ceramic, polymer, non-metallic, ceramic-ceramic composite, ceramic-polymer composite, ceramic-metal composite, metal-polymer composite, polymer-polymer composite, metal-metal composite, or a combination of one or more of these. Geometries may be porous or dense, flat or tapered, uniform or non-uniform, planar or wavy, straight or curved, non-patterned or patterned, micron or sub-micron, grain size confined or not, or a combination of one or more of these.

In the exemplary implemetation outlined in FIG. 3, electrodes 102 and 202 are formed by available press/coat/mask/print techniques in step 309 followed by formation of green electrode layer(s) using, for example, printing techniques. Alternative methods of forming the electrode layers 102 and 202 include any method including but not limited to spin coating, dip coating, surface coating a porous structure, powder pressing, casting, screen printing, tape forming, curtain deposition, physical sputtering, reactive sputtering, physical vapor deposition, chemical vapor deposition, ion beam, e-beam deposition, molecular beam epitaxy, laser deposition, plasma deposition, electrophoretic deposition, magnetophoretic deposition, thermophoretic deposition, stamping, cold pressing, hot pressing, pressing with an additive and then removal of the additive by heat or solvents or supercritical fluids, physical or chemical routes, placing metal plates or films on certain parts of the active material, inserting wire, chemically transforming section in the active layer, centrifugal casting, gel casting, investment casting, extrusion, electrochemical deposition, screen-stencil printing, stacking and laminating, brush painting, self-assembly, forming with biological processes, or a combination of one or more of the above-mentioned methods.

After preparation of the stack, the stack may for some applications be cut cross sectionally into thin slices in step 313 to expose the layers of the active layer and the electrode. In another embodiment, one or more of step 307, step 309, and step 313 may be skipped. In such cases, it is necessary that the equipment containing the catalytic device provide external electrodes or equivalent means in some form to enable the flow of charge through the active material. Finally, given the catalytic properties of the active layer, some of the steps in FIG. 3 may be assisted or accomplished through the use of said catalytic properties.

Each slice obtained from step 313 in FIG. 3 is a device that can be used in a circuit shown as FIG. 4 to transform one or more species in a gas, vapor, liquid, supercritical fluid, solid or a combination of these. In step 315 the stack is calcined or sintered to reach structural robustness, consistency, and performance in the active material and green electrode layers.

In one embodiment, the device is terminated by forming an electrical coupling to electrodes 102, 202 in step 317 enabling application of an external electrical field. In a preferred embodiment, it is desirable that the active material and the electrode layers be isolated from external environmental damage such as that from thermal, mechanical, chemical, electrical, magnetic, or radiation effects, or a combination of one or more of these. This desired protection may be achieved in step 317 by providing a conformal covering (not shown) over the layers on the unexposed surfaces, such as an polymer conformal protective layer. In another preferred embodiment, the exposed surface may also be isolated from external thermal, mechanical, chemical, electrical, magnetic, or radiation damage by covering with a layer of ceramic or porous rigid material mesh. In yet another preferred embodiment, the exposed surface may be covered with a layer that enhances the selectivity of the feed species reaching the active surface. Such a layer can include, but is not limited to, polymers, metals, zeolites, self-assembled materials, or porous media, each of which has a higher permeability for the analyte of interest and a lower permeability for other species that are not of interest. In some preferred embodiments the exposed surface is covered with polymers such as but not limiting to polyethylene, polypropylene, fluoropolymer resins such as TEFLON®, polycarbonates, or polyaromatics. However, it is generally preferable that any covering on the exposed surface does not impede the interaction of the analyte or analytes to be transformed with the active layer by an amount greater than the species that are not of interest. Exceptions to this general rule may be made in certain cases, for example, when it is critical to protect the element from destructive effects of the environment. In another embodiment, steps 317 and 319 may be skipped.

FIG. 4 shows an exemplary chemical transformation system or reactor 400 in using the chemical transformation processes and devices in accordance with the present invention. The reactor 400 shown in FIG. 4 is notable for its simplicity due to the fact that high pressures and high temperatures are not required because of the superior performance of transformation device 401 in accordance with the present invention. The present invention enables useful chemical transformations at operating temperatures less than 300 C., preferably less than 250 C., and more preferably less than 200 C. Desirably the operating temperature is selected to be less than or equal to the ignition temperature of the chemical composition that is being transformed. The electrodes of device 401 are coupled in a circuit with power supply 402 so as to supply an electromagnetic field between the opposing electrodes of device 401. The circuit shown in FIG. 4 is illustrative; it may be replaced with any suitable circuit that can provide a flow of charge, internally (such as but not limiting to ohmic or ion flow or hole flow based current) or externally (such as but not limiting to eddy current or induced current from applied electromagnetic field) or both, in a given application.

Power supply 402 may supply direct current, alternating current, or any other form of electromagnetic waveform. The charge may be induced to flow in the device when the device is wired or through the use of wireless techniques. In a typical operation the applied power is less than 15 Watts per gram of catalyzing substance.

The device 401 may include a single device such as shown in FIG. 1 and FIG. 2 or an array of elements such as shown in FIG. 1 and FIG. 2. The electrodes of the device(s) 401 may alternatively provide means to connect the device to induce interaction with an externally induced field such as but not limited to radio frequency or microwave frequency waves, or the equivalent.

Reactor 400 includes an inlet port 403 for receiving a feed stream and an outlet 404 producing a reactant stream. In operation, feed gas or liquid passes in contact with device 401 while power supply 402 is active and is transformed before passing from outlet 404. Device 401 shown in FIG. 4 may be placed in reactor 400 in various ways to manufacture and practice useful equipment such as, but not limiting to, obstrusive or non-obstrusive manner, as randomly or periodically arranged packed bed, with or without baffles to prevent short circuiting of feed, in open or closed reactors, inside pipes or separately designed unit, with accessories such as mixers, in a system that favors laminar or plug or turbulent or no flow, sealed or unsealed, isolated or non-isolated, heated or cooled, pressurized or evacuated, isothermal or non-isothermal, adiabatic or non-adiabatic, metal or plastic reactor, straight flow or recycle reactor, co-axial or counter-axial flow, and reactor or array of reactors that is/are available.

Table 3 lists example reactor technologies that may be used in accordance with the present invention. To illustrate the scope without limiting it, some examples from the art are listed in Table 3 and some in Kirk-Othmer Encyclopedia of Chemical Technology, Reactor Technology, John Wiley & Sons, Vol 20, pp 1007–1059 (1993) which is hereby incorporated by reference.

TABLE 3

Illustrative reactor designs

| Stirred Tank | Tubular | Tower |
| Fluidized Bed | Batch | Continuous |
| Packed Bed | Film | Recycle |
| Plug Flow | Semibatch | Non-ideal |
| Membrane | Bioreactor | Multistage |

APPLICATIONS

The method and techniques disclosed can be applied to prepare catalysts and devices in manufacturing of useful chemicals and drugs. The superior performance of the method and device proposed for chemical composition transformation may be used to produce intermediates or final products. Some illustrative, but not limiting reaction paths where this invention can be applied are listed in Table 4. Reactions that utilize one or more elementary reaction paths in Table 4 can also benefit from the teachings herein. The benefits of such applications of teachings are many. To illustrate but not limit, the near ambient condition operation can reduce the cost and ease the ability to control chemical synthesis; it can in some cases lesser levels of thermal shocks during start ups and shut downs can enhance the robustness of the catalysts. In general the invention can be applied to produce useful materials from less value added materials, readily available raw materials, or waste streams.

TABLE 4

| $A + s \longleftrightarrow As$ | $2A + s \longleftrightarrow A_2s$ | $A + 2s \longleftrightarrow 2A_{\frac{1}{2}}s$ |
| $As \longleftrightarrow Rs$ | $A_2s + s \longleftrightarrow 2As$ | $2A_{\frac{1}{2}}s \longleftrightarrow Rs + s$ |
| $Rs \longleftrightarrow R + s$ | $As \longleftrightarrow Rs$ | $Rs \longleftrightarrow R + s$ |
| | $Rs \longleftrightarrow R + s$ | |
| $A + s \longleftrightarrow As$ | $A + s \longleftrightarrow As$ | $A + s \longleftrightarrow As$ |
| $As + s \longleftrightarrow Rs + Ss$ | $As \longleftrightarrow Rs + S$ | $B + s \longleftrightarrow Bs$ |
| $Rs \longleftrightarrow R + s$ | $Rs \longleftrightarrow R + s$ | $As + Bs \longleftrightarrow Rs + s$ |
| $Ss \longleftrightarrow S + s$ | | $Rs \longleftrightarrow R + s$ |
| $A + s \longleftrightarrow As$ | $A + 2s \longleftrightarrow 2A_{\frac{1}{2}}s$ | $B + s \longleftrightarrow Bs$ |
| $B + s \longleftrightarrow Bs$ | $B + s \longleftrightarrow Bs$ | $A + Bs \longleftrightarrow Rs + S$ |
| $As + Bs \longleftrightarrow Rs + Ss$ | $2A_{\frac{1}{2}}s + Bs \longleftrightarrow Rs +$ | $Rs \longleftrightarrow R + s$ |
| $Rs \longleftrightarrow R + s$ | $Ss + s$ | |
| $Ss \longleftrightarrow S + s$ | $Rs \longleftrightarrow R + s$ | |
| | $Ss \longleftrightarrow S + s$ | |

One of the significant commercially important application of this invention is in providing candidates to and in improving the performance of catalysis science and technology. This is particularly desirable for existing precious-metal and non-precious metal based catalytic formulations, heterogeneous and homogeneous catalysis, and for catalytic applications such as but not limiting to those and as known in the art and which are herewith included by reference. To illustrate the scope without limiting it, some examples where this invention can be applied are listed in Tables 5A, 5B, 5C, 5D, 5E, 5F and some are listed in the art such as Kirk-Othmer Encyclopedia of Chemical Technology, Catalysis, John Wiley & Sons, Vol 5, pp 320–460 (1993) and references contained therein.

TABLE 5A

ILLUSTRATIVE APPLICATIONS

| Catalyst | Reaction |
|---|---|
| metals (e.g., Ni, Pd, Pt, as powders or on supports) or metal oxides (e.g., $Cr_2O_3$) | C = C bond hydrogenation (e.g., olefin + $H_2$ $d_3$ 2-paraffin) |
| metals (e.g., Cu, Ni, Pt) | C = O bond hydrogenation (e.g., acetone + $H_2$ $d_3$ 2-propanol) |
| metal (e.g., Pd, Pt) | Complete oxidation of hydrocarbons, oxidation of CO |
| Fe, Ru (supported and promoted with alkali metals) | $3\ H_2 + N_2 \rightarrow 2\ NH_3$ |
| Ni | $CO + 3\ H_2 \rightarrow CH_4 + H_2O$ (methanation) <br> $CH_4 + H_2O \rightarrow 3\ H_2 + CO$ (steam reforming) |
| Fe or Co (supported and promoted with alkali metals) | $CO + H_2$ $d_3$ paraffins + olefins + $H_2O + CO_2$ (+ oxygen-containing organic compounds) (Fischer-Tropsch reaction) |
| Cu (supported on ZnO, with other components, e.g., $Al_2O_3$) | $CO + 2\ H_2 \rightarrow CH_3OH$ |
| Re + Pt (supported on $Al_2O_3$ and promoted with chloride) | paraffin dehydrogenation, isomerization and dehydrocyclization (e.g., heptane $\rightarrow$ toluene + 4 $H_2$) (naphtha reforming) |
| solid acids (e.g., $SiO_2$—$Al_2O_3$, zeolites) | paraffin cracking and isomerization; aromatic alkylation; polymerization of olefins |
| $Al_2O_3$ | alcohol $\rightarrow$ olefin + $H_2O$ |
| Pd supported on zeolite | paraffin hydrocracking |
| metal-oxide-supported complexes of Cr, Ti, or Zr | olefin polymerization (e.g., ethylene $d_3$ polyethylene) |
| metal-oxide-supported complexes of W or Re | olefin metathesis (e.g., 2 propylene $d_3$ ethylene + butene) |
| $V_2O_5$ or Pt | $2\ SO_2 + O_2 \rightarrow 2\ SO_3$ |
| $V_2O_5$ (on metal-oxide support) | naphthalene + 9/2 $O_2$ $\rightarrow$ phthalic anhydride + 2 $CO_2$ + 2 $H_2O$ <br> o-xylene + 3 $O_2$ $\rightarrow$ phthalic anhydride + 3 $H_2O$ |
| Ag (on inert support, promoted by alkali metals) | Ethylene + ½ $O_2$ $\rightarrow$ ethylene oxide (with $CO_2$ + $H_2O$) |
| bismuth molybdate, uranium antimonate, other mixed metal oxides | propylene + ½ $O_2$ $d_3$ acrolein <br> propylene + 3/2 $O_2$ + $NH_3$ $d_3$ acrylonitrile + 3 $H_2O$ |
| mixed oxides of Fe and Mo | $CH_3OH + O_2$ $d_3$ formaldehyde (with $CO_2$ and $H_2O$) |
| Fe3O4 or metal sulfides | $H_2O + CO$ $d_3$ $H_2 + CO_2$ (water gas shift reaction) |
| Co—Mo/$Al_2O_3$ (S) and Ni—Mo/$Al_2O_3$ (S) and Ni—W/$Al_2O_3$ (S) | olefin hydrogenation, aromatic hydrogenation hydrodesulfurization, hydrodenitrogenation |

TABLE 5B

ILLUSTRATIVE APPLICATIONS

| Catalyst | Industry process |
|---|---|
| Hydrogen, carbon monoxide, methanol, and ammonia | |
| ZnO, activated C | Feed pretreatment for reforming |
| supported Ni, Cr-promoted Fe | Reforming <br> Shift reaction |
| CuO—ZnO—$Al_2O_3$ | |
| supported Ni | Methanation |
| promoted Fe | Ammonia synthesis |
| Cu—Cr—Zn oxide, Zn chromite | Methanol synthesis |

TABLE 5B-continued

ILLUSTRATIVE APPLICATIONS

| Catalyst | Industry process |
|---|---|
| chromite | |
| Hydrogenation | |
| 25% Ni in oil | Edible and inedible oil |
| activated Ni | Various products |
| Dehydrogenation | |
| chrome alumina | Butadiene from butane |
| promoted Fe oxide | Styrene from ethylbenzene |
| Oxidation, ammoxidation, oxychlorination | |
| supported Ag | Ethylene oxidefrom ethylene |
| Pt—Rh gauze | Nitric acid from ammonia |
| $V_2O_5$ on silica | Sulfuric acid from sulfur dioxide |
| $V_2O_5$ | Maleic anhydride from benzene |
| $V_2O_5$ | Phthalic anhydride from o-xylene and naphthalene |
| copper chloride | Ethylene dichloride |
| Organic synthesis | |
| Pt and Pd on C and $Al_2O_3$ | petrochemicals and specialty chemicals |
| anhydrous $AlCl_3$ | Ethylbenzene, detergent alkylate, etc. |
| phosphoric acid | Cumene, propylene trimer, etc. |
| - Polymerization | |
| Al alkyls and/or $TiCl_3$ | Ziegler - Natta processing |
| Cr oxide on silica | Polyethylene (by Phillips process) |
| Peresters | Polyethylene (low density) |
| Percarbonates | Poly (vinyl chloride) |
| benzoyl peroxide | Polystyrene |
| Amines, organotin compounds | Polyurethanes |

TABLE 5C

ILLUSTRATIVE APPLICATIONS

Oxychlorination Catalysts (Fixed bed / Fluid bed)
Catalysts for Methyl Chloride, Methyl Amine, and Melamine processing
Catalysts for isomerization of low carbon hydrocarbons such as C4 and C5/C6
Guard bed catalyst
HDS, HDN, hydrodemetallization and hydrogenation catalyst
Metal and Alloy Catalysts such as but not limiting to NiMo and CoMo
Sulfided catalyst
Catalysts for Ethylene Oxide (EO), one of the major building blocks of the chemical industry, used in the manufacture of Mono Ethylene Glycol (MEG), Ethoxylates, Ethanolamines and many other derivatives. MEG itself is a feedstock for the production of antifreeze, polyester, fibers and PET bottles.
Catalysts for $CO_2$ Lasers and other equipment so that they can be operated without replenishing the operating gases
Sponge Metal catalysts (also known as raney catalysts)

TABLE 5D

ILLUSTRATIVE APPLICATIONS

Catalysts for FCC Pretreatment
Catalysts for hydrotreatment of heavy VGO or VGO/Resid TABLE 5D-continued

ILLUSTRATIVE APPLICATIONS blends with a high metals content, high CCR and high final boiling point.
Catalysts for Hydrocracking Pretreatment, Mild Cracking, and Hydrocracking
Hydroprocessing catalysts and Fluid Cat Cracking (FCC) Catalyst
Pretreat catalysts in general, such as but not limiting to hydrodemetallization, Conradson carbon removal, hydrodenitrogenation and hydrodesulfurization.
Amorphous and zeolite based Hydrocracking catalysts.
Catalysts for Resid hydrotreatment
Catalysts to derive maximum product value from LPG olefins such as propylene, iso-butylene and iso-amylenes.
Catalysts to maximize octane barrels by improving octane without sacrificing gasoline yield.
Catalysts to maximize production of transportation fuels such as gasoline and diesel from any feedstock.
Catalysts for maximum mid-distillate production, such as diesel and jet fuels.
Catalysts to extend the frontiers of resid cracking, balancing bottoms conversion, low delta coke and metals tolerance.
Catalysts for maximum octanes (RON and MON) and light olefins production
Catalysts to provide maximum octane barrels for applications where excellent octanes at maximum gasoline yield is required

TABLE 5E

ILLUSTRATIVE APPLICATIONS

Catalysts for selective catalytic reduction (SCR) technology. Illustrative, but not exhaustive applications include Gas Turbines, Chemical Plants (e.g. Nitric Acid, Caprolactam, etc.), Waste Incinerators, Refinery Heaters, Ethylene Crackers, and Gas Motors.
Zeolites and related applications of zeolites (Adsorption, Separation, Catalysis, and Ion Exchange)
Emission-control coatings and systems that remove harmful pollutants, improve fuel economy and enhance product performance in a wide range of applications, including: trucks and buses, motorcycles, lawn and garden tools, forklifts, mining equipment, aircraft, power generation, and industrial process facilities.
Surface coatings for design, manufacture and reconditioning of critical components in aerospace, chemical and petrochemical industries.
Catalysts used in preparing, processing, and treating semiconductor industry gases, liquids, and emissions
Catalysts are capable of destroying ozone (the main component of smog) already in the air.
Catalysts to lower ozone, NOx, and SOx levels
Catalysts for Combustion
Catalysts to improve air quality

TABLE 5F

ILLUSTRATIVE APPLICATIONS OF CLAIMED INVENTION

Catalysts that facilitate the manufacture of petrochemicals, fine chemicals, fats, oils and pharmaceuticals and aid in petroleum refining.
Catalysts that purify fuel, lubrication oils, vegetable oils and fats.
Catalysts for water filtration technologies.
Food and Beverage Industry Catalysts.
Paper, Pulp, and Glass Industry Catalysts
Catalysts for producing Inorganic chemicals
Antimicrobial Catalysts TABLE 5F-continued

ILLUSTRATIVE APPLICATIONS OF CLAIMED INVENTION

Catalysts to in-situ produce chemicals used in households
Enzyme and Microbial Catalysts
Catalysts used in biomedical business. Important products include but do not limit to powerful narcotic-based pain killers such as sufentanil, fentanyl base and hydromorphone.
Catalysts used in forensic equipment and sensors
Catalysts used in analytical instruments The teachings of the present invention can be used to research and develop, to rapidly screen novel catalysts by techniques such as combinatorial methods, and to optimize catalysts through the use of arrays in electrical and microelectronic circuits.

The application of electrical current in particular, and electromagnetic field in general, can enable the ability to extend the life of catalysts, or improve their activity, yields, light off temperatures, turn over rates, stability, and selectivity with or without simultaneous changes in the operating conditions such as temperature, pressure, and flow profile. The catalyst so operated with electromagnetic field is anticipated to enable reactor temperatures and pressures or conditions that are more desirable to customers and integrated to the operating conditions of a specific manufacturing scheme. Furthermore, this invention of applying electromagnetic effects on the catalyst can enable reaction schemes that are switched on or off at will by switching on or off of the electromagnetic field respectively. Such flexibilities can be highly valuable in controlling and enhancing of safety of reactions that may be explosive or that may yield dangerous and hazardous byproducts. The invention can also be applied to produce multiple useful products from same reactor through the variation on-demand of the applied electromagnetic field or feed or other operating conditions required to meet the needs of a particular application.

The benefits of this invention can be practiced in lowering the light-off temperatures in combustion exhaust systems. As one illustration of many applications, it is known in the art that emission control catalysts such as the three-way catalysts placed in automobile exhausts operate efficiently at temperatures greater than about 350° C. These non-ambient temperatures require a heat source and often the exhaust heat from the vehicle's engine is the principal source of the needed heat. During initial start up phase of the engine, it takes about a minute to heat the catalyst to such temperatures. Consequently, the vehicle emission controls are least effective during the start. Methods to rapidly heat the catalyst to such temperatures or lower temperature catalysts are desired. Methods have been proposed to preheat the catalysts by various techniques, however, such techniques require high power to operate, add weight, and are not robust. The teachings contained herein can be used to prepare catalytic units or modify existing catalytic units to operate at lower temperatures (less than 350° C., preferably less than 200° C.) and quicker light-offs. These teachings apply to combustion in general and to emission control systems used in other mobile and stationary units. The teachings may also be practiced by coating the engine cylinder's inside, operating the said coating with electrical current during part of or the complete combustion cycles. Such an approach can help modify the reaction paths inside the cylinder and thereby prevent or reduce pollution-at-source.

The benefits of the teachings contained herein can be applied to the control of difficult-to-treat species such as NOx, SOx, CFCs, HFCs, and ozone. One method is to prevent these species from forming through the use of novel catalytic devices with electrical current in particular, and electromagnetic field in general. Alternatively, using such catalytic devices with electrical current, streams containing these species may be treated with or without secondary reactants such as CO, hydrocarbons, oxygen, ammonia, urea, or any other available raw material, or combinations thereof.

The invention is particularly useful for applications that currently require high temperatures or heavy equipment due to inherently high pressures during reaction or excessive volumes, as the teachings of the presently claimed invention can offer a more economically desirable alternative. Illustrations of such applications, without limiting the scope of this invention, include pollutant treatment or synthesis of fuel and useful chemicals in space vehicles, submarines, fuel cells, miniature systems in weight sensitive units such as automobiles, airplanes, ships, ocean platforms, remote sites and habitats. This can help reduce the weight of the unit, reduce capital costs, reduce inventory costs, and reduce operating costs. Any applications that desire such benefits in general can utilize the teachings of this invention.

The invention can offer a long sought alternative for catalyzing reactions on feeds that contain poisoning species, i.e. species that can cause reversible or irreversible poisoning of available catalysts (for example, but not limiting to, illustrations in Table 6A and 6B).

TABLE 6A

| Process or Product | Catalytic Material | Catalyst Poisons |
|---|---|---|
| Ammonia | $FeO/Fe_2O_3$ promoted by $Al_2O_3$ and $K_2O$ | Moisture, CO, $CO_2$, $O_2$, compounds of S, P, and As |
| Aniline | Ni powder, $Al_2O_3$ Raney-Ni or —Cu, Cu— chromite | Groups VA and VIA elements |
| Butadiene | $Ca_8Ni(PO_4)_6$ $Cr_2O_3$ on $Al_2O_3$ Bi-molybdate $Fe_2O_3 + Cr_2O_3 + K_2O$ | Halides, $O_2$, S, P, Si |
| Ethanol | $H_3PO_4$ on Kieselguhr | $NH_3$, $O_2$, S, organic base |
| Ethylene oxide | Ag-oxide on refractory oxide | Compounds of S |
| Formaldehyde | Ag on $Al_2O_3$ Ag needles $FeO_3 + MoO_3$ | $Cl_2$, S compounds |
| Methanol | $ZnC + Cr_2O_3$ CuO | S compounds, Fe, Ni S compounds |
| Nitric acid | Pt on Rh | Compounds of As and $Cl_2$ |
| Polyethylene | Al-alkyl-Ti tetrachloride Precipitate | Moisture, alcohols, $O_2$, $So_2$, COS, $CO_2$, CO |
| Styrene | (a) $Fe_2O_3 + K_2O +$ $Cr_2O_3$ (b) $Fe_2O_3 + K_2CO_3 +$ $Cr_2O_3 +$ $V_2O_5$ | Halides, S compounds, O, P, Si |
| Sulfuric Acid | $V_2O_5 + K_2O$ on Kieselguhr | Halides, As, Te |
| Cracking alkylation, and isomerization of petroleum fraction | Synthetic aluminosilicate; $AlCl_3$ $H_3PO_4$ | Organometallic compounds, organic bases |
| Desulfurization, denitrogenation, and deoxygenation | $(NiO + MoO_3)$ (CoO + $MoO_3$) or (NiO + $WO_3$) on alumina | $H_2S$, CO, $CO_2$, heavy hydrocarbon deposits, compounds |

TABLE 6A-continued

| Process or Product | Catalytic Material | Catalyst Poisons |
|---|---|---|
| | | of Na, As, Pb |

TABLE 6B

| Reaction | Active catalyst | Poisons and inhibitors | Mode of action |
|---|---|---|---|
| $NH_3$ synthesis | Fe | S, Se, Te, P, As compounds, halogens $O_2$, $H_2O$, NO $CO_2$ CO unsaturated hydrocarbons | poison: strong chemisorption or compound formation weak poison: oxidation of Fe surface: reduction possible, but causes sintering inhibitor: reaction with alkaline promoters poison and inhibitor: strong chemisorption, on reduction slowly converted to methane: accelerates sintering inhibitor: strong chemisorption, slow reduction |
| Hydrogenation | Ni, Pt, Pd, Cu | S, Se, Te, P, As compounds, halogens Hg and Pb compounds $O_2$ CO | poison: strong chemisorption poison: alloy formation poison: surface oxide film Ni forms volatile carbonyls |
| Catalytic cracking | alumino-silicate | amines, $H_2O$ coking | inhibitor: blockage of active centers poison: blockage of active centers |
| $NH_3$ oxidation | Pt—Rh | P, As, Sb, compounds; Pb, zn, Cd, Bi rust alkaline oxides | poison: alloying, gauze becomes brittle causes $NH_3$ decomposition poison: reacts with $Rh_2O_3$ |
| $SO_2$ oxidation | $V_2O_5$— $K_2S_2O_7$ | As compounds | inhibitor $d_3$ poison: compound formation |

To illustrate this feature of the present invention, it is well known in the art that precious metal catalysts are useful in numerous reactions. However, these and other catalysts tend to get poisoned when the feed stream contains sulfur or sulfur containing species. Extensive and often expensive pre-treatment of the feed streams is often required to ensure that the catalyst is not poisoned. The present invention describes materials and devices that can catalyze reactions with non-precious metal based formulations that are not known to be poisoned by sulfur. Thus, through appropriate variations in catalyst composition and electromagnetic field, chemical reactions may be realized even if poisoning species are present. This reduces or eliminate the need for expensive and complex pre-treatment of feed streams.

This method is not limited to precious metal poisoning and can be applied to finding catalyst alternatives for presently used catalysts that are based on other materials (supported, unsupported, precipitated, impregnated, skeletal, zeolites, fused, molten, enzyme, metal coordination, ion exchange, bifunctional, basic, acidic, sulfide, salt, oxide, metal, alloys, and intermetallic catalysts). The method is also not limited to sulfur poisoning and the teachings can be used when poisoning or loss in stability is caused by species other than sulfur. The method can also be applied to cases where solutions need to be found for catalysts or systems that undergo coking, thermal run away, and chemical effects.

The invention also offers a method of developing and practicing non-precious alternatives to expensive precious metal-based catalysts. This can reduce catalyst costs. Such uses of invention are desirable in automobile exhaust catalysts, emissions treatment catalysts, naphtha catalysts, petroleum cracking catalysts, and applications that utilize precious metals. Notwithstanding such use and uses discussed earlier, these teachings are not meant to limit to the teachings of presently claimed invention to non-precious metals and materials based thereof. Precious metals and materials based thereof may be used in the practice of this invention's teachings.

The benefits of the teachings contained in this invention can be utilized in research and development and manufacture of inorganic, organic, and pharmaceutical substances from various precursors, such as but not limiting to illustrations in Table 7A, 7B, 7C, 7D, 7E, 7F, and 7G.

TABLE 7A

Illustrative Inorganic Reactants and Product Candidate for Catalysis

| | | |
|---|---|---|
| Ammonia | Magnetite | Calcium carbide |
| Ammonium nitrate | Oxides | Calcium carbonate |
| Ammonium carbonate | Nitric acid | Calcium chloride |
| Ammonium perchlorate | Phosphoric acid | Calcium cyanamide |
| Ammonium sulfite | Nitrogen oxides | Calcium hydroxide |
| Carbon | Metals and Alloys | Sulfur |
| Carbon dioxide | Pyrite | Thiourea |
| Carbon disulfide | Sulfur Oxides | Titanium dioxide |
| Carbon monoxide | Carbonates | Urea |
| Radicals | Sodium nitrate | Zinc sulfide |
| Lead Sulfide | Sodium sulfite | Sulfur dioxide |
| Ozone | Alkalis | Hydrogen Sulfide |

TABLE 7B

Illustrative Inorganic Reactions Candidate for Application of this Invention

| Reaction | Current Catalyst |
|---|---|
| Para-$H_2$ conversion | hydrated Fe oxides |
| Production of $H_2$ and CO steam reforming of methane $H_2O + CH_4 \rightarrow 3 H_2 + CO$ | Ni/$Al_2O_3$ |
| watergas shift reaction $CO + H_2O \rightarrow H_2 + CO_2$ | Fe—Cr oxides Cu—Zn oxides |
| Methanation $CO + 3 H_2 \rightarrow CH_4 + H_2O$ | Ni |
| Oxidation of $NH_3$ to NO $NH_3 + 1.25 O_2 \rightarrow NO + 1.5 H_2O$ | Pt—Rh wire gauze |
| Synthesis of amonia $N_2 + 3 H_2 \rightarrow 2 NH_3$ | $Fe_3O_4$ promoted With K, Ca, Mg, Al |
| Oxidation of $SO_2$ to $SO_3$ | $V_2O_5$ |
| Claus process recovery of S from $SO_2$ + $H_2S$ $2 H_2S + SO_2 \rightarrow 3 S + 2 H_2O$ | $Al_2O_3$ |
| Decomposition of $NH_3$ $2 NH_3 \rightarrow N_2 + 3 H_2$ | Ni/ceramic |

TABLE 7C

Organic Reactants and Product Candidate for Catalysis

| | | | |
|---|---|---|---|
| Acetaldehyde | Cyclohexane | Isobutene | Peracetic acid |
| Acetone | Metallorganics | Isocyanates, alcohols | Styrene |
| Acetylene | Cyclohexene | Isoprene | Propylene |
| Acrylonitrile | Cyclopentene | Methane | Adipic Acid |
| Amide | Ethane | Methanol | Aliphatics |
| Aliphatic glycols | Ethanol | Methyl methacrylate | Tetrachlorobenzene |
| Aniline | Ethyl acetate | Nitroacetanilide | Tetranitromethane |
| Acetic Acid | Ethyl nitrate | Nitroalkanes | Triphenylsilane |
| Alkanes | Ethyl nitrite | Nitrobenzene | Urea |
| Benzaldehyde | Ethylene | Aromatics | Alkenes |
| Benzene | Ethylene | 2,4-Dinitroacetanilide | Vinyl chloride |
| Ethyl nitrate | Butadiene | n- Pentane | Alkynes |
| Ethyl nitrite | m-Chloroaniline | Phenol, m-cresol | Dendrimers |
| Propylene | Propane | Propionic Acid | Ethylene Oxide |
| Aldehydes | Alcohols | Ketones | Acids |
| Anhydrides | Amines | Isomers | Oxides |
| Sulfur Organics | Phospho-Organics | Salts | Alkaloids |
| Styrene | Nitro Organics | Fullerenes | Bio-derived |
| Cumene | CFCs | HFCs | Monomers |
| Cycloalkanes | Cycloalkenes | Cycloalkynes | Cage Compounds |

TABLE 7D

Illustrative Organic Reactions Candidate for Application of the present Invention

| Reaction | Current Catalyst |
|---|---|
| Selective hydrogenation | |
| edible oils | Raney Ni, Ni—NiO/support |
| inedible oils | Raney Ni, Ni—NiO/support |
| acetylene → ethylene | supported Pd + Pb, S, quinoline |
| diolefins → olefins | Pd/$Al_2O_3$ |
| unsaturated aldehydes → saturated aldehydes | Pt/support |
| unsaturated aldehydes → saturated alchohols | Pt/support (Zn—Fe) |
| unsaturated nitriles → saturated nitriles | Pd/C |
| unsaturated anhydrides → saturated anhydrides | Pd/support |
| Aromatic hydrogenation | |
| benzene → cyclohexane | Ni/support, Raney Ni |
| phenol → cyclohexanone | Pt/support |
| phenol → cyclohexanol | Pt/support or Ni |
| naphthalene → tetra - and decahydronaphthalenes | Ni/support |
| Asymmetric hydrogenation | Rh - cyclooctadiene with phosphine |
| Hydrogenation | |
| nitriles → amines | Raney Co |
| oximes → hydroxylamines | Pt or Pd |
| aldehydes → alcohols | NiO/support, Cu chromite |
| Reduction | |
| nitro compounds → amines | Pd/C, Cu chromite |
| acids → alcohols | Raney Co, Cu chromite |

TABLE 7D-continued

Illustrative Organic Reactions Candidate for Application of the present Invention

| Reaction | Current Catalyst |
|---|---|
| succinic anhydride → butyrolactone | Ni/SiO$_2$ |
| acyl chlorides → aldehydes (Rosenmund reaction) | Pd/BaSO$_4$ |

TABLE 7E

Illustrative Organic Reactions Candidate for Application of the present Invention

| Reaction | Current Catalyst |
|---|---|
| Dehydrogenation | |
| butenes → butadiene | Ca(Sr)Ni phosphate |
| ethylbenzene → styrene | Fe$_2$O$_3$—Cr$_2$O$_3$ (K$_2$O) |
| Butane → butadiene | Cr$_2$O$_3$/Al$_2$O$_3$ |
| Hexane → benzene | Pt/Al$_2$O$_3$ |
| Cyclohexane → benzene | Pt/Al$_2$O$_3$ |
| Cyclohexanol → cyclohexanone | ZnO (alkali) |
| Oxidative dehydrogenation | |
| butenes → butadiene | Bi molybdate |
| alcohols → aldehydes, ketones | ZnO, Cu chromite, Raney Ni |
| Liquid-phase oxidation | |
| ethylene → acetaldehyde | PdCl$_2$—CUCl$_2$ |
| propene → acetone | PdCl$_2$—CuCl$_2$ |
| butene → 2-butanone | PdCl$_2$—CuCl$_2$ |
| ethylene + acetic acid → vinyl acetate | PdCl$_2$—CuCl$_2$ |
| propene + acetic acid → allyl acetate | PdCl$_2$—CUCl$_2$ |
| cyclohexane + cyclohexanol + cyclohexanone | Co acetate |
| buane → acetic acid | Co acetate |
| actaldehyde → acetic anhydride | Co acetate |
| cylohexanol + cyclohexanone → adipic acid | V salt (+ HNO$_3$ as oxidant) |
| toluene → benzoic acid | Co acetate |
| benzoic acid → phenol | Cu |
| p-xylene → terephthalic acid | Co acetate |
| m-xylene → isophthalic acid | Co acetate |
| Vapor-phase oxidation | |
| ethylene → ethylene oxide | Ag/support |
| alcohols → aldehydes or ketones | Fe$_2$O$_3$—MoO$_3$ or Ag |
| propene, isobutene → unsaturated aldehydes | Cu$_2$O, Bi molybdate |
| o-xylene, naphthalene → phthalic anhydride | V$_2$O$_5$/TiO$_2$, V$_2$O$_5$—K$_2$S$_2$O$_7$/SiO$_2$ |
| butane or butene → maleic anhydride | V$_2$O$_5$—P$_2$O$_5$/support |
| benzene → maleic anhydride | V$_2$O$_5$—MoO$_3$, (P$_2$O$_5$)/support |

TABLE 7F

Illustrative Organic Reactions Candidate for Application of this Invention

| Reaction | Current Catalyst |
|---|---|
| Ammoxidation | |
| propene + NH$_3$ → acrylonitile | Bi molybdate, U—Sb oxides |
| isobutene + NH$_3$ → methacrylonitrile | multicomponent oxide |
| toluene + NH$_3$ → benzonitrile | V$_2$O$_5$—MoO$_3$/Al$_2$O$_3$ |
| m-xylene + NH$_3$ → isophthalonitrile | V$_2$O$_5$—MoO$_3$/Al$_2$O$_3$ |
| o-xylene + NH$_3$ → phthalonitrile | V$_2$O$_5$—Sb$_2$O$_5$ |
| 3- or 4-picoline + NH$_3$ → 3- or 4-cyanopyridine | V$_2$O$_5$—MoO$_3$/Al$_2$O$_3$ |
| methane + NH$_3$ → hydrogen cynanide | Pt—Rh wire gauze |
| Oxychlorination | |
| ethylene + 2 HCl + 0.5 O$_2$ → vinyl chloride + H$_2$O | CuCl$_2$/Al$_2$O$_3$ |
| Hydration | |
| Ethylene → ethanol | H$_3$PO$_4$/SiO$_2$ |
| propene → 2-propanol | H$_3$PO$_4$/SiO$_2$ |
| Dehyrdation | |
| x-phenylethanol → styrene | NaPO$_3$/SiO$_2$, Al$_2$O$_3$ |
| higher alcohols → olefins | Zeolite |
| acids + ammonia → nitriles | H$_3$PO$_4$/SiO$_2$ |
| butylene glycol → butyrolactone | |
| alcohols + ammonia → amines | SiO$_2$/Al$_2$O$_3$ |
| Miscellaneous reactions | |
| benzene + ethylene → ethylbenzene | BF$_3$/Al$_2$O$_3$, AlCl$_3$ |
| benzene + propene → cumene | H$_3$PO$_4$/SiO$_2$ |
| isocyanuric acid → melamine | Al$_2$O$_3$ |
| cumene hydroperoxide → phenol + acetone | H$_2$SO4 |

TABLE 7G

Illustrative Reactions Candidate for Application of this Invention

| Reaction | Current Catalyst |
|---|---|
| Methanol synthesis | |
| CO + 2H$_2$ → CH$_3$OH | ZnO—Cr$_2$O$_3$ Cu—ZnO—Al$_2$O$_3$ Cu—ZnO—Cr$_2$O$_3$ |
| Methanation | |
| CO + 3 H$_2$ → CH$_4$ + H$_2$O | NI/Al$_2$O$_3$ |
| CO + H$_2$ d$_3$ → higher alcohols + H$_2$O | CuCoM$_{0.8}$K$_{0.1}$oxide, M = Cr, Mn, Fe, or V |
| Fischer - Tropsch synthesis | |
| CO + H$_2$ d$_3$ → hydrocarbons + H$_2$O | Fe oxide (promoted) |
| Hydroformylation (Oxo reaction) | |
| olefin + CO + H$_2$ d$_3$ → aldehyde | HCo (CO)$_4$ HRh (CO) (PPh$_3$)$_3$ |
| Miscellaneous | |
| CH$_3$I + CO d$_3$ → CH$_3$COI | [Rh(CO)$_2$I$_2$] |
| CH$_2$O + H$_2$ + CO d$_3$ → HOCH$_2$CHO | HRh(CO)$_2$(PPh$_3$)$_3$ |
| CH$_2$O + CO + H$_2$O d$_3$ → HOCH$_2$COOH | Nafion-H resin |
| Addition | |
| ethylene + butadiene → 1,4-hexadiene + 2,4-hexadiene | RhCl$_3$ |

TABLE 7G-continued

Illustrative Reactions Candidate for
Application of this Invention

| Reaction | Current Catalyst |
|---|---|
| Cyclization | |
| 2 butadiene → cis,cis-1,5-cyclooctadiene | Ni (acrylonitrile)$_2$ + PPh$_3$ |
| 3 butadiene → 2,5,9-cyclododecatriene | Ni (acrylonitrile)$_2$ |
| Olefin metathesis (dismutation) | |
| 2 propene → ethylene + butene | Mo or W/Al$_2$O$_3$ or W/SiO$_2$ |
| cyclohexene + ethylene → 1,7-octadiene | |
| Oligomerization | |
| 2 ethylene → butene | Al(C$_2$H$_5$)$_3$ |
| ethylene → θ-olefins | |
| Polymerization | |
| ethylene → polyethylene | TiCl$_4$ + Al(C$_2$H$_5$)$_3$ |
| propene → polypropylene (isotactic) | CrO$_3$/SiO$_2$ |
| | MoO$_3$/Al$_2$O$_3$ |
| butadiene → polybutadiene | TiCl$_3$ + Al(C$_2$H$_5$)$_3$ |
| 1,4-trans- | Al(i-C$_4$H$_9$)$_3$ + VOCl$_3$ |
| 1,4-cis- | Al(i-C$_4$H$_9$)$_2$Cl + CoCl$_2$ |
| 1,2-isotactic | Al(i-C$_4$H$_9$)$_3$ + Cr(PhCN)$_6$ |
| 1,2-syndiotactic | Al(i-C$_4$H$_9$)$_3$ + MoO$_2$(O-i-C$_4$H$_9$)$_2$ |
| Petrochemistry | |
| Catalytic cracking | Zeolite, alumina-silica |
| Catalytic reforming | Pt/Al$_2$O$_3$ or bimetallic |
| Alkylation | catal. /Al$_2$O$_3$ |
| Isomerization | H$_2$SO$_4$ or HF |
| Hydrocracking | Pt/alumina |
| | Ni/SiO$_2$—Al$_2$O$_3$ or Ni—W/SiO$_2$—Al$_2$O$_3$ or Pd/zeolite |
| Hydrofining or hydrotreating | Co—Mo/Al$_2$O$_3$, Ni—W/Al$_2$O$_3$ |

These benefits of the present invention can also be utilized in the manufacture of fuels, propellants, chemicals, biochemicals, petrochemicals and polymer. Furthermore, the use of electromagnetic energy and active materials in high surface area form can provide benefits in microbe-based, cell-based, tissue-based, and artificial implant-based devices and reaction paths. Finally, the benefits of this invention can be applied to gaseous, liquid, solid, superfluid, plasma or mixed phase reactions. These devices can be enabling to the production of improved and novel products. To illustrate, the catalyst with optimization techniques available in the art can enable devices to produce hydrogen from low cost chemicals, which in turn can be used to prepare hydrogen based engines, alternative fuel vehicles, hybrid vehicles, captive power generation and other applications.

To illustrate, the teachings contained herein, preferably combined with optimization techniques available in the art, can enable affordable devices to produce hydrogen from low-cost chemicals (such as but not limiting to methanol, agriculturally derived ethanol, gasoline, natural gas, gasohol), which in turn can be used to prepare hydrogen based engines, alternative fuel vehicles, hybrid vehicles, captive power generation and other applications. The teachings can assist in reducing the costs of implementing novel engine-based vehicles and power generation equipment since the distribution infrastructure of said low-cost chemicals to homes, buildings, and roads already exists.

The novel chemical composition transformation method and devices as described can be utilized to degrade undesirable species from a feed into more preferred form. Illustration include degradation of species such as toluene, methylethyl ketone, ethylene oxide, methylene chloride, formaldehyde, ammonia, methanol, formic acid, volatile organic vapors, odors, toxic agents, biomedical compounds into intermediates or final products such as carbon dioxide and water vapor. In another application, organics in liquid streams may be treated using these devices. Alternatively, novel chemical composition transformation devices as described can be utilized to remove and recover precious and strategic metals from liquid waste streams; or to remove hazardous metal ions from waste streams (waste water). The device can also be used to purify fluid streams by removing low concentrations of contaminants such as in preparing extremely pure water or extremely pure gases needed in semiconductor device manufacturing.

The invention can be applied to automatically and on-demand clean contaminants and stained surfaces such windows in skyscrapers and hotels, and window shields of automobiles and aircraft. Stains are often organic in nature or comprises of substances that change the refractive index of a surface. A thin nanostructured coating of transparent ceramic or film (such as but not limiting to indium tin oxide, doped glasses, metals, and ceramics) can be deposited with electrodes printed connecting said film. The film can be part of an electrical circuit that is triggered on-demand to catalyze the substance in any stain on surface of interest. The invention may also be integrated in air conditioners, heating, and ventilation systems to clean air, or at-source and conveyors of emissions such as carpets, combustion chambers, and ducts. The teachings can also be utilized to build low-cost odor control systems inside microwaves, refrigerators, and portable or plug-in type odor removal devices at homes and offices. Odors are organic chemicals and preferred method of treating odors is to transform the chemicals responsible for odor into carbon oxide and moisture. The teachings contained herein can be applied to produced catalytic units that transform the chemicals responsible for odors into more desired products. Similarly, the teachings can yield devices to address the problems inside printers and photocopiers and other such office and industrial equipment that emit gases such as ozone and volatile chemicals.

The invention can enable the use of multifunctional equipment. An illustration of this, without limiting the scope, would be to coat the surface of a pipe with conducting formulation and then conduct the reaction while the raw material is been transported from source to some desired destination. The pipe in this case performs more than one function—it helps transport the feed and it also enables the reaction to occur during such transport.

The invention can be applied in membrane reactors, ion exchange units, catalytic distillation, catalytic separation, analytical instruments, and other applications that combine the benefits of catalysts with chemical unit operations known in the art.

This invention can also be utilized to develop and produce products that are based on catalytic or high surface area-based properties of materials used in the product. An illustrative, but not limiting, product of this type would be one that sense, react, trigger, or adapt to changes in environment in general, and in the chemical composition of a fluid in particular such as the teachings in commonly assigned U.S. patent application Ser. No. 09/074,534 filed May 7, 1998, now pending and which is incorporated herewith. The invention can be generically applied to develop and produce products that sense, react, trigger, or adapt to changes in the environment such as changes in the thermal state, mechanical state, magnetic state, electromagnetic state, ionic state, optical state, photonic state, chromatic state, electronic state, biological state, or nuclear state, or a combination of two or more of these. In all cases, when the teachings contained herein are applied to a device in conjunction with electrical field, the benefit obtained is the modification of surface state of the active material and/or the modification in the property of the active material and/or the modification in the environment, as the said surface interacts with the environment.

As a non-limiting example, if the active layers are prepared from thermally sensitive material compositions, rapid response thermal sensors can be produced. In another example, if piezoelectric compositions are used in the active layer in a multilaminate stack, vibration and acceleration sensors can be produced. In yet another example, magnetic compositions can yield rapid response magnetic sensors and magnetoresistive sensors. If the active layer instead is prepared from compositions that interact with photons, novel chromatic, luminescent, photodetectors and photoelectric devices may be produced. With compositions interacting with nuclear radiation, sensors for detecting nuclear radiation may be produced. In another example, with biologically active layers, biomedical sensors may be produced. With insulating interlayers, these device may be thermally isolated or made safe and reliable. The active layers can be mixed, as discussed before, to provide multifunctional devices and products. The sensing layers may be cut or left intact for specific applications. The sensing layer may be just one layer or a multitude of as many layers as cost-effectively desirable for the application. The electrode may also be one layer or a multitude of as many layers as cost-effective and necessary for the application. These sensors have performance characteristics desired in chemical, metallurgical, environmental, geological, petroleum, glass, ceramic, materials, semiconductor, telecommunications, electronics, electrical, automobile, aerospace and biomedical applications. Such sensors can be combined with metrology techniques and transducers to produce smart products and products that adapt and learn from their environments.

EXAMPLE 1

Silicon Carbide (SiC) Active Material 246 mg of SiC nanopowders (mean grain size: 60.3 nm, 65 m2/gm) was cold pressed into pellets of ¼" in diameter and ⅛" in thickness at 1500 psi. This SiC pellet showed a resistance of 93 ohms after being pressed. The pellet was mounted on a sample holder with two electrical contacts on the pellet's sides. The sample holder was transferred into a continuous flow reactor chamber (FIG. 4). The reactor apparatus shown in FIG. 4 includes a port (not shown) for installing the pellet of active material between two electrodes, and is augmented with ports (not shown) for following gas sensors: a carbon dioxide (CO2) IR sensor, a water vapor (H2O) sensor and a hydrogen (H2) sensor to detect and monitor the change in concentration of the products. The gas sensors may be useful for particular applications but are not essential to the operation of device 401 in accordance with the present invention. Any available sensor may be used to monitor particular chemical (either feed chemical or reactant chemical) in reactor 400.

In the first example, a mixture of 250 ml/min of nitrogen (N2) and 10 ml/min of air were passed through the reactor and the background or baseline response of the sensors were registered. Next, the gas mix was bubbled through a methanol (CH3OH) containing bubbler and passed over the catalyst pellet while the electrical circuit was off. With electrical power off, no changes in the baseline response of sensors was detectable. Next, the power was switched on by gradual increase in the voltage across the 98 ohms SiC pellet. At, approximately 3.9 watt power input to the pellet (equivalent to less than 16 W/gm), active reaction over the SiC pellet was observed and the CO2 and H2O sensors started registering change in composition. Thereafter, both CO2 and H2O detectors began to register increasing amounts of CO2 gas and water vapors. The reaction reached a steady state concentration of CO2 at about 700 ppm in about 10 minutes. The ratio between H2O and CO2 was observed to be about 2:1 at steady state. The reaction temperature was about 140° C. which is about four fold less than the ignition temperature of methanol (which is 470° C.). The following reaction may explain the observations:

$$CH3OH + 3/2 O2 \rightarrow CO2 + 2H2O \tag{A1}$$

Several pellets were prepared and tested to establish reproducibility. To investigate the possibility that the SiC pellet is degrading or getting consumed during the reaction, the pellets were examined using X-ray diffraction before and after the chemical reactions for 45 minutes of steady state reaction and for incomplete reaction. The examination revealed no weight changes or SiC diffraction peaks changes were detectable between before and after state of a reaction example. This suggests that the pellet is behaving as a catalyst.

EXAMPLE 2

Indium-Tin Oxide Active Material and Treatment of Methanol

A mixture of 75% by weight of Indium-Tin Oxide (ITO) nanopowders (ratio of Indium to Tin: 90:10, mean grain size: 12.9 nm, 60.9 m2/gm) was mixed with 25% by weight of alumina nanopowders (mean grain size: 4.6 nm, 56 m2/gm). The nanopowder mix were cold pressed into nanocomposite pellets of ¼" in diameter and ⅛" in thickness at 1500 psi. The resistance of nanostructured pellet was found to be 81 ohms. Using the same reactor setup as in example 1, at approximately 3.9 watt power input to the pellet, active reaction over the ITO nanocomposite pellet was observed and the CO2 and H2O sensors started registering change in composition. Thereafter, both CO2 and H2O detectors began to register increasing amounts of CO2 gas and water vapors. The reaction reached a steady state concentration of CO2 at about 530 ppm in about 12 minutes. The ratio between H2O and CO2 was observed to be about 2:1 at steady state. The pellet temperature was less than 100° C. which is about four fold less than the ignition temperature of methanol (which is 470° C.). Four pellets identically produced and identically investigated reproduced these results.

EXAMPLE 3

Indium-Tin Oxide Active Material and Production of Useful Chemical from Methanol ITO-alumina nanocomposite pellet of example 2 was exposed to higher concentrations of oxygen. In this example while the total flow was kept constant at 260 ml/min, the N2 flow was reduced to 225 ml/min but the airflow increased from 10 to 35 ml/min. The increase in oxygen flow was observed to reduce the H2O vapor registered by moisture sensor and increase the hydrogen sensor response suggesting the production of hydrogen gas and reduction in H2O produced. This suggests that this method and device can be applied to produce useful chemicals such as hydrogen. Furthermore, variations in operating conditions can be utilized to produce multiple products.

The ratio between H2O and CO2 was observed to be about 1:5 at steady state and of hydrogen and carbon dioxide to be slightly less than 2:1. The pellet temperature was observed to be about five fold less than the ignition temperature of methanol (which is 470° C.). The high concentration of hydrogen indicates that a possible reaction as in equation A2 might have taken place.

$$5CH_3OH + 3O_2 \rightarrow 5CO_2 + H_2O + 9H_2 \quad (A2)$$

The effect of changing feed ratios was observed to be similar with other pellets at higher powers and higher oxygen flow. Thus, this suggests that the principle behind this method and device is broadly applicable and can be applied to produce useful chemicals such as hydrogen.

EXAMPLE 4

Magnetic Oxide and Silicon Carbide Nanocomposite Active Material

95% by weight Cu0.1Zn0.4Ni0.5Fe2O4 nanopowder (mean grain size: 29 nm, 19.4 m2/gm) with 5% SiC nanopowders (mean grain size: 60.3 nm, 65 m2/gm) were mixed and formed into pellets. The resistances of the mixture pellets was found to be about 73 ohms. The nanocomposite pellet exhibited its ability chemical transform methanol at 3.8 watt when the methanol was fed in a carrier gas mix of 250 ml/min N2 and 10 ml/min Air. The produced CO2 and H2O concentrations were about 1:2 ratio. This example suggests that the method and device works for oxide-carbide nanocomposite as well.

EXAMPLE 5

Magnetic Oxide and ITO Nanocomposite Active Material

95% by weight Cu0.1Zn0.4Ni0.5Fe2O4 nanopowder (mean grain size: 29 nm, 19.4 m2/gm) with 5% ITO nanopowders (mean grain size: 12.9 nm, 60.9 m2/gm) were mixed and formed into pellets. The resistance of the mixture pellet was about ten times higher than previous examples at 900 ohms. The pellet exhibited ability to chemically transform methanol at 4.53 watt when methanol was fed in a carrier gas mixture of 250 ml/min N2 and 10 ml/min Air. The produced CO2 and H2O concentrations were once again about 1:2. This example suggests that the method and device works for higher resistance pellets and for magnetic oxide—conducting oxide nanocomposite as well.

EXAMPLE 6

Dielectric and Conducting Oxide Nanocomposite Active Material

95% TiO2 nanopowder (mean grain size: 75 nm, 15.6 m2/gm) with 5% ITO nanopowder (mean grain size: 12.9 nm, 60.9 m2/gm) were mixed and formed into pellets. The resistance of the mixture pellet was observed to be about 330 ohms. The pellet exhibited ability to chemically transform methanol at 4.32 watt in 250 ml/min N2 and 10 ml/min Air. The produced CO2 and H2O concentrations were about 1:2 in ratio. This example suggests that the method and device works for higher resistance pellets and for dielectric—conducting oxide nanocomposite as well.

EXAMPLE 7

Nanocomposite Active Material and Other Organics

75% by weight ITO nanopowders (mean grain size: 12.9 nm, 60.9 m2/gm) and 25% by weight alumina nanopowders (mean grain size: 4.6 nm, 56 m2/gm) were mixed and formed into pellets as in example 2. The resistance of the mixture nanocomposite pellet was found to be about 81 ohms. In this example, ethanol was used instead of methanol to see if the invention is applicable to species other than methanol. The carrier gas was same as in example 2, that is 250 ml/min N2 and 10 ml/min Air. Once again, the set up was same as example 2. It was observed that reaction of ethanol began when the power input to the pellet reached 3.55 watt. The CO2 and H2O concentrations as sensed by the sensors were in 1:1.25 approximate ratio—which is a bit off stoichiometric if the reaction was a complete conversion of ethanol to carbon dioxide and water vapor. This example suggests that the nanocomposite active material may be applied to alcohols other than methanol and that the reactions may be conducted to intermediate levels.

EXAMPLE 8

Nanocomposite Active Material and Other Organics

In this example, the pellet and feed system of example 7 was used. In this example, toluene was used instead of alcohols to see if the invention is applicable to species other than alcohols. It was observed that reaction of toluene began when the power input to the pellet reached 3.55 watt. The CO2 and H2O concentrations as sensed by the sensors were in 2:1 approximate ratio—which is again bit off stoichiometric if the reaction was a complete conversion of toluene to carbon dioxide and water vapor. This example suggests that the nanocomposite active material may be applied to organics in general (aromatic bonds are more difficult to break than aliphatic) and that the reactions may be conducted to intermediate levels.

EXAMPLE 9

Nanocomposite Active Material and Inorganics

In this example, the pellet and feed system of example 7 was once again used. In this example, an inorganic species (ammonium hydroxide) was used instead of organics to see if the invention is applicable to species other than organics. It was observed that reaction of ammonium hydroxide began when the power input to the pellet reached 3.55 watt. The steady state H2 and H2O concentrations as sensed by the sensors were in 1:2 approximate ratio. This example suggests that the nanocomposite active material may be applied to inorganics as well.

EXAMPLE 10

Nanopowder-Micron Powder Composites

50% by weight ITO nanopowder (mean grain size: 12.9 nm, 60.9 m2/gm) and 50% Copper micron-size powders were mixed and formed into pellets as in example 2. The resistance of the mixture pellet was found to be about 500 ohms. The pellet exhibited ability to chemically transform methanol at 2.1 watt in 250 ml/min N2 and 10 ml/min Air. This pellet in presence of electromagnetic field produced only 98 ppm of CO2 as detected by the carbon dioxide sensor; the moisture sensor did not detect any H2O concentration change over the baseline. This suggests that the invention can be applied to micron sized powders, to metal based composites, and to vary the reaction pathway as well.

EXAMPLE 11

Nanocomposite Pellets in Presence of Varying Field

In this example, pellet of example 3 was used. The power to the pellet was cycled to investigate the effect of varying field. The observations confirmed reproducible results in chemical transformation of methanol. When the power was switched off, the CO2 and moisture readings of the sensor returned to the baseline suggesting that the reaction had stopped. When the power was switched back again, the CO2 and moisture readings of the sensor in the exhaust of the reactor returned to the steady state readings suggesting that the reaction had restarted. The reaction could be switched on and off at will by switching or varying the field, i.e. current passing through the pellet.

In this example, sulfur containing species were passed through the pellet to see if the pellet will be poisoned by the sulfur species. The chemical activity of the pellet was observed to remain unaffected by the sulfur species.

EXAMPLE 12

Resistor in Presence of Field

This example demonstrates that the ability to transform chemical species is really because of the conducting formulation pellets. While keeping everything same as in example 2, the pellet was replaced with a resistor of 100 ohm. The power to the resistor was increased from 0 to 6 W and left in such state for over 10 minutes. No reactions of methanol were observed. Similarly, everything else remaining same, use of a metal wire of similar resistance instead of the pellet in example 2, failed to show any catalytic effects even after the wire was visibly hot. This example suggests that the reactions observed in previous examples were effects of the pellets and not off materials or fields other than the pellet.

EXAMPLE 13

This example demonstrates that the ability to transform chemical species is not just a thermal effect. A heating plate was placed inside reactor of Example 2 and just the pellet removed. Everything else was left as is and kept same including the wires, sensors, fittings etc. The heating plate temperature was raised to 300° C. and methanol fed through the reactor as in Example 2. No chemical composition change was detectable. This example suggests that the reactions observed in previous examples were effects of the pellets.

EXAMPLE 14

This example demonstrates that the ability to transform chemical species using coated films and electrical current. Three 5 mm×5 mm glass slide with 90:10 by weight % Indium Oxide:Tin Oxide coating were cleaned to remove any dust or chemicals and it was ensured that each slide was optically clear. Next 2 microliters of dielectric oil was smeared on each slide to simulate a stain. Slide A was used as control and left in air. Slide B was placed on a heating plate and Slide C was placed in the electrical circuit of Example 1. Slide B was heated and no effect on stain was visually observed over a period of 10 minutes while the temperature of the slide was less than 120° C. The oil stain on Slide B disappeared at 135° C. in about 4 minutes. The stain on slide C disappeared in about 2 minutes when 60 milliamps of current passed through the coating at 20 volts potential. The coating temperature was just 90° C. While the rise in slide temperature was not surprising given that electrical current causes ohmic heating, the disappearance of the stain at low temperature is surprising and may be attributable to catalytic transformation of the stain by electrical current. Slide A in air showed no change in stain for more than 30 minutes indicating that stains do not disappear by themselves in air at ambient conditions. This example suggests that the teachings herein can be used in a coating form as well and that stains can be removed using such a technique by simply turning on and off an electrical circuit connected to coated slide.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

We claim:

1. A method of transforming a chemical composition comprising:

provided a source of hydrogen containing compound;

providing a quantity of catalyst with interface area greater than 1 square centimeter per gram;

exposing the hydrogen containing compound to the quantity of catalyst; and providing a flow of current in the quantity of catalyst by applying an electromagnetic field across the quantity of catalyst during the exposure to the hydrogen containing compound to transform the hydrogen containing compound into hydrogen.

2. The method of claim 1, wherein the step of providing a flow of current comprises applying a voltage across the quantity of catalyst.

3. The method of claim 1, wherein the catalyst comprises one or more nanopowders.

4. The method of claim 1 wherein the hydrogen containing compound comprises methanol and the exposing step occurs at an operating temperature less than or equal to ignition temperature of methanol.

5. The method of claim 4, wherein the hydrogen containing compound comprises methanol and the operating temperature is less than about 250° C.

6. A method of chemical transformation of a feed composition into a product composition wherein the feed composition comprises a hydrogen containing compound and the product composition comprises molecular hydrogen, the method comprising the steps of:

providing at least one electrode;

providing a selected substance with interface area greater than 1 square centimeter per gram;

coupling the selected substance electrically to the at least one electrode;

exposing the selected substance to the feed composition; and causing current to flow from the at least one electrode through the selected substance to cause the selected substance to catalyze the transformation of the feed composition into the product composition.

7. The method of claim 6, wherein the step of causing the current to flow further comprises applying a voltage across the selected substance using the at least one electrode to create an electrical current in the selected substance.

8. The method of claim 6, wherein the substance comprises a nanopowder.

9. The method of claim 6, wherein the hydrogen containing compound comprises hydrocarbon and the step of causing the selected substance to catalyze the transformation of the feed composition into the product composition occurs at operating temperature less than or equal to ignition temperature of the feed composition.

10. The method of claim 9, wherein the hydrogen containing compound comprises methanol and the operating temperature is less than 250° C.

11. A method of producing at least one useful substance comprising molecular hydrogen from raw materials comprising a hydrogen containing compound, the method comprising:

providing a catalyzing substance in an electrical circuit;

exposing the raw materials to the catalyzing substance; and causing a current to flow in the catalyzing substance by applying an electromagnetic field across the catalyzing substance using said electrical circuit while the raw materials catalyze into the at least one useful substance.

12. The method of claim 11, wherein the raw materials further comprise an organic compound.

13. The method of claim 12, wherein the catalyzing substance has an operating temperature less than or equal to ignition temperature of the raw material.

14. The method of claim 12, wherein the current is an electrical current from applied voltage across the catalyzing substance.

15. The method of claim 12, wherein the electrical power to the catalyzing substance is less than 15 Watts per gram of catalyzing substance.

16. A method of producing a useful substance from raw materials comprising a carbon containing compound, the method comprising the acts of:

providing a catalyzing substance in an electrical circuit;

exposing the raw materials to the catalyzing substance; and causing a current to flow in the catalyzing substance by applying an electric, magnetic field across the catalyzing substance using said electrical circuit while the raw materials catalyze into the useful substance.

17. A method of producing a useful substance from raw materials comprising a nitrogen containing compound the method comprising the acts of:

providing a catalyzing substance in an electrical circuit;

exposing the raw materials to the catalyzing substance; and causing a current to flow in the catalyzing substance by applying an electromagnetic field across the catalyzing substance using said electrical circuit while the raw materials catalyze into the useful substance.

18. A method of producing a useful substance from raw materials comprising a oxygen containing compound, the method comprising the acts of:

providing a catalyzing substance in an electrical circuit;

exposing the raw materials to the catalyzing substance; and causing a current to flow in the catalyzing substance by applying an electromagnetic field across the catalyzing substance using said electrical circuit while the ran materials catalyze into the useful substance.

* * * * *